(12) United States Patent
Lishner et al.

(10) Patent No.: US 11,884,020 B2
(45) Date of Patent: Jan. 30, 2024

(54) PRINT HEAD AND METHOD OF CALIBRATING THE SAME

(71) Applicant: Stratasys Ltd., Rehovot (IL)

(72) Inventors: Itai Lishner, Yahud (IL); Barak Glassman, Nes Ziona (IL)

(73) Assignee: Stratasys Ltd., Rehovot (IL)

( * ) Notice: Subject to any disclaimer, the term of this patent is extended or adjusted under 35 U.S.C. 154(b) by 339 days.

(21) Appl. No.: 16/957,776

(22) PCT Filed: Dec. 4, 2018

(86) PCT No.: PCT/IL2018/051327
§ 371 (c)(1),
(2) Date: Jun. 25, 2020

(87) PCT Pub. No.: WO2019/130293
PCT Pub. Date: Jul. 4, 2019

(65) Prior Publication Data
US 2021/0060864 A1    Mar. 4, 2021

Related U.S. Application Data

(60) Provisional application No. 62/610,538, filed on Dec. 27, 2017.

(51) Int. Cl.
*B29C 64/393* (2017.01)
*B33Y 10/00* (2015.01)
(Continued)

(52) U.S. Cl.
CPC ......... *B29C 64/393* (2017.08); *B29C 64/112* (2017.08); *B29C 64/209* (2017.08);
(Continued)

(58) Field of Classification Search
CPC ............. B41J 3/00–62; B41J 2/043536; B41J 2/04536; B41J 2/0456; B41J 2/0457;
(Continued)

(56) References Cited

U.S. PATENT DOCUMENTS

| 4,121,457 A | * | 10/1978 | Yoshida | ............... | G01F 23/241 340/604 |
| 6,259,962 B1 | | 7/2001 | Gothait | | |

(Continued)

FOREIGN PATENT DOCUMENTS

| JP | 06-015843 | | 1/1994 |
| JP | H0615843 A | * | 1/1994 |
| WO | WO 2013/132484 | | 9/2013 |

OTHER PUBLICATIONS

International Preliminary Report on Patentability dated Jul. 9, 2020 From the International Bureau of WIPO Re. Application No. PCT/IL2018/051327. (9 Pages).

(Continued)

*Primary Examiner* — Matthew J Daniels
*Assistant Examiner* — Andrew L Swanson

(57) ABSTRACT

A method of calibrating a print head of a printing system comprises applying voltage to the print head to effect a dispensing of liquid material from the print head; receiving, directly from a sensor within the print head, a signal correlative to a change in an amount of liquid in the print head; and varying the voltage responsively to the signal.

8 Claims, 12 Drawing Sheets

(51) Int. Cl.
   *B33Y 30/00* (2015.01)
   *B33Y 50/02* (2015.01)
   *B29C 64/112* (2017.01)
   *B29C 64/209* (2017.01)
   *B41J 2/045* (2006.01)

(52) U.S. Cl.
   CPC ............... *B33Y 10/00* (2014.12); *B33Y 30/00* (2014.12); *B33Y 50/02* (2014.12); *B41J 2/04508* (2013.01); *B41J 2/04586* (2013.01)

(58) Field of Classification Search
   CPC .... B41J 2/0458; B41J 2/04581; B41J 2/0459; B29C 64/112; B29C 64/165; B29C 64/386–393; B33Y 10/00; B33Y 50/00–02
   See application file for complete search history.

(56) References Cited

U.S. PATENT DOCUMENTS

| | | |
|---|---|---|
| 6,336,695 B1 | 1/2002 | Ha |
| 6,569,373 B2 | 5/2003 | Napadensky |
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,658,976 B2 | 2/2010 | Kritchman |
| 7,962,237 B2 | 6/2011 | Kritchman |
| 9,718,238 B2 | 8/2017 | Teken et al. |
| 2007/0076040 A1* | 4/2007 | Shang ............... B41J 3/28 347/19 |
| 2008/0094430 A1* | 4/2008 | Richards ............ B41J 2/17566 347/9 |
| 2008/0266339 A1* | 10/2008 | Snyder ............... B41J 2/2128 347/12 |
| 2013/0278657 A1 | 10/2013 | Martin et al. |
| 2015/0035186 A1* | 2/2015 | Teken ............... B29C 64/209 425/169 |
| 2015/0138280 A1* | 5/2015 | Clippingdale ....... B41J 2/04541 347/54 |

OTHER PUBLICATIONS

International Search Report and the Written Opinion dated Mar. 21, 2019 From the International Searching Authority Re. Application No. PCT/IL2018/051327. (16 Pages).

Communication Pursuant to Article 94(3) EPC dated May 11, 2022 From the European Patent Office Re. Application No. 18827258.7. (3 Pages).

* cited by examiner

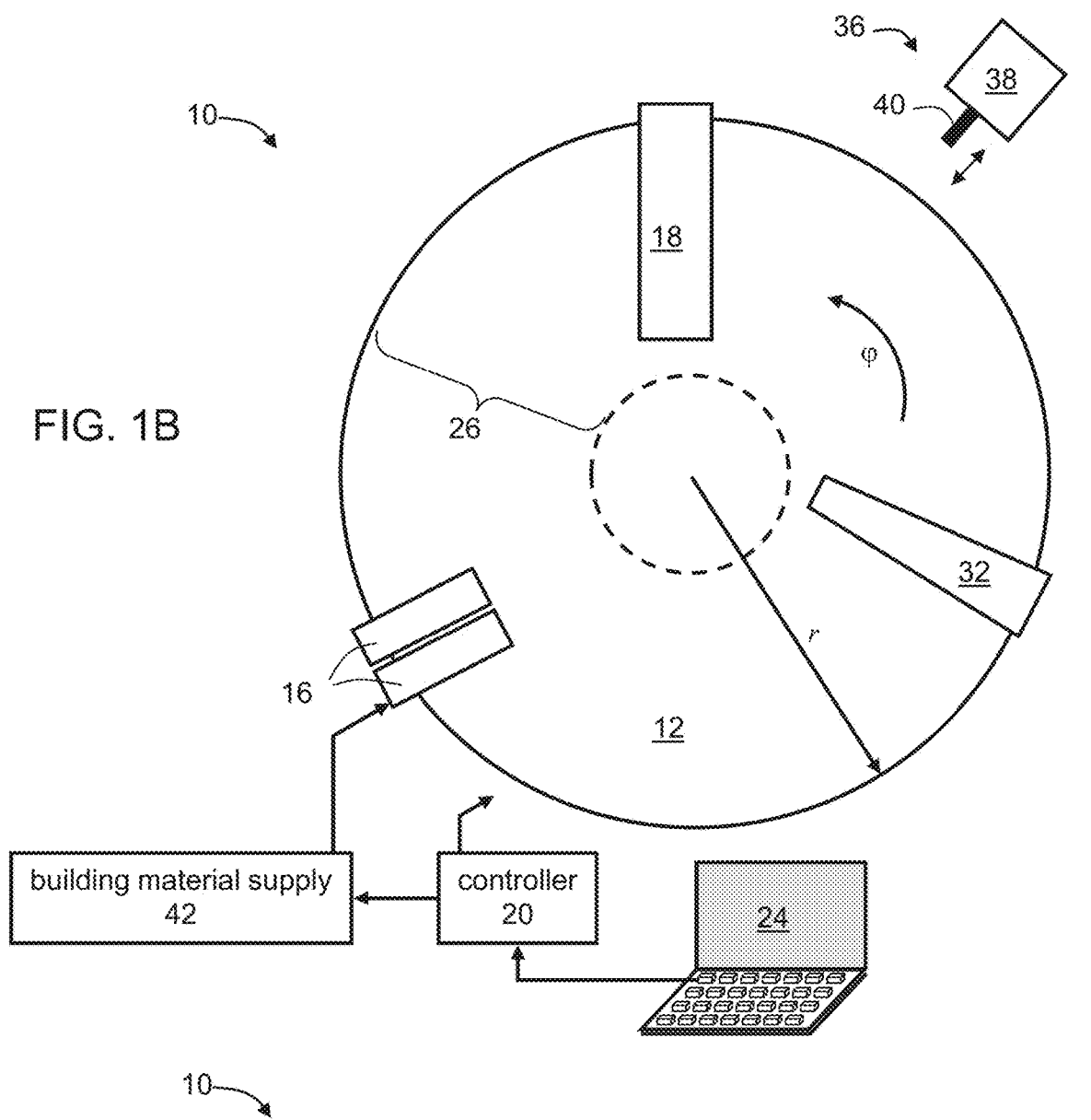
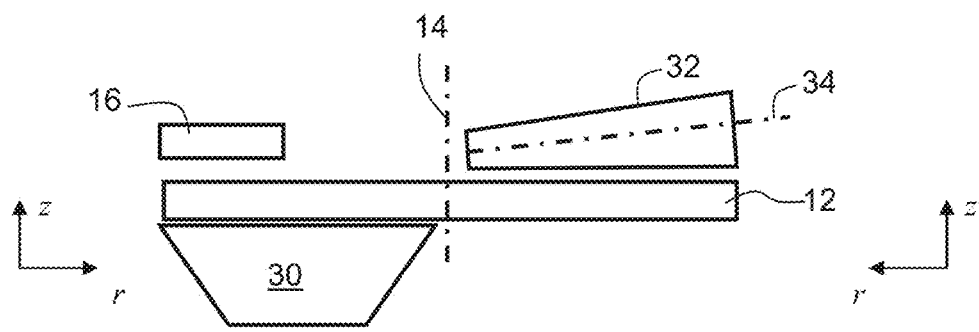

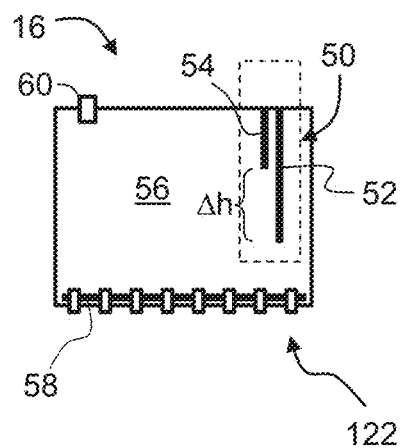 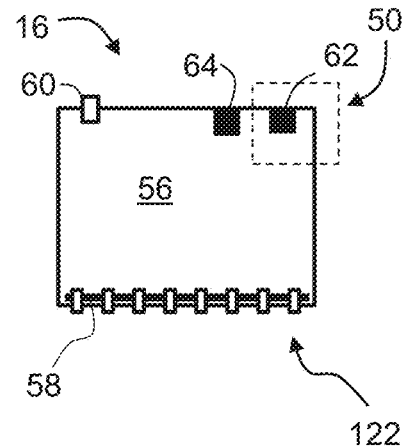
FIG. 3D  FIG. 3E
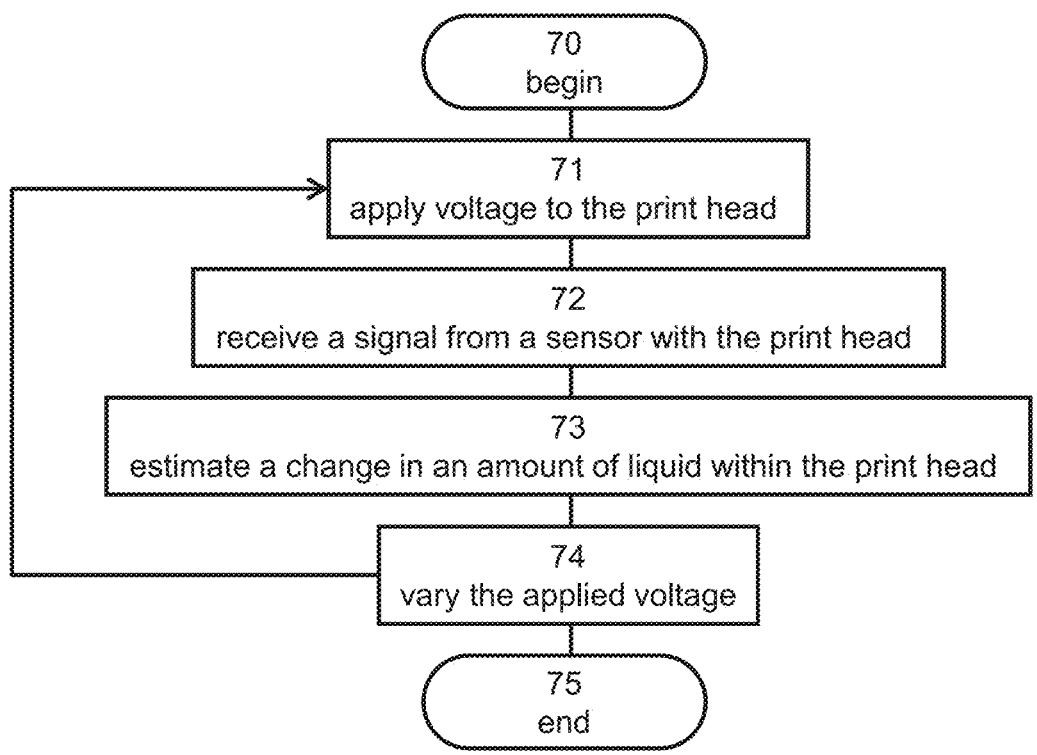
FIG. 4

PRINT HEAD AND METHOD OF CALIBRATING THE SAME

RELATED APPLICATIONS

This application is a National Phase of PCT Patent Application No. PCT/IL2018/051327 having International filing date of Dec. 4, 2018, which claims the benefit of priority under 35 USC § 119(e) of U.S. Provisional Patent Application No. 62/610,538 filed on Dec. 27, 2017. The contents of the above applications are all incorporated by reference as if fully set forth herein in their entirety.

FIELD AND BACKGROUND OF THE INVENTION

The present invention, in some embodiments thereof, relates to printing and, more particularly, but not exclusively, to a print head, e.g., a print head of a three-dimensional printing system, and method of calibrating the print head.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing.

The basic operation of any additive manufacturing system consists of slicing a three-dimensional computer model into thin cross sections, translating the result into two-dimensional position data and feeding the data to control equipment which manufacture a three-dimensional structure in a layerwise manner.

Additive manufacturing entails many different approaches to the method of fabrication, including three-dimensional printing, laminated object manufacturing, fused deposition modeling and others.

In three-dimensional printing processes, for example, a building material is dispensed from a print head having a set of nozzles to form layers of deposited material on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335 7,209,797, 7,225,045, 7,300,619, 7,479,510, 7,500,846, 7,658,976, 7,962,237 and 9,718,238 all of the same Assignee, the contents of which are hereby incorporated by reference.

SUMMARY OF THE INVENTION

According to an aspect of some embodiments of the present invention there is provided a method of calibrating a print head of a printing system. The method comprises: applying voltage to the print head to effect a dispensing of liquid material formulation from the print head; receiving, directly from a sensor within the print head, a signal correlative to a change in an amount of liquid in the print head; and varying the voltage responsively to the signal.

According to an aspect of some embodiments of the present invention there is provided a method of printing an object. The method comprises receiving printing data describing the object, printing of the object by a printing system based on the printing data, and executing a method of calibrating a print head at least once, wherein the dispensing the liquid material formulation is executed based on the printing data to form part of the object, and wherein the method of calibrating is the method as delineated above, and optionally and preferably as further detailed below.

According to some embodiments of the invention the print head comprises a plurality of nozzles for dispensing the liquid material formulation, wherein the voltage is applied individually to each of the nozzles, and wherein the method comprises detecting variations in dispensing capability among the nozzles.

According to an aspect of some embodiments of the present invention there is provided a print head for a printing system. The print head comprises: a single compartment for holding liquid material formulation; a nozzle in direct fluid communication with the compartment; an actuator for ejecting the liquid through the nozzle in response to voltage applied thereto; and a liquid level sensor having two sensing elements within the compartment at a fixed height difference therebetween.

According to an aspect of some embodiments of the present invention there is provided a printing system, which comprises a print head as delineated above and optionally and preferably as further detailed below, and a controller having a circuit configured for applying voltage to the actuator to eject the liquid material formulation through the nozzle, for receiving from the sensor a signal correlative to a change in an amount of liquid in the compartment, and for varying the voltage responsively to the signal.

According to an aspect of some embodiments of the present invention there is provided a printing system, which comprises a print head having a compartment for holding liquid material formulation, a nozzle in direct fluid communication with the compartment, and an actuator for ejecting the liquid through the nozzle in response to voltage applied thereto. The printing system optionally and preferably comprises a controller having a circuit configured for applying voltage to the actuator to eject the liquid material formulation through the nozzle, for receiving from the sensor a signal correlative to a change in an amount of liquid in the compartment, and for varying the voltage responsively to the signal.

According to some embodiments of the invention the print head comprises a plurality of nozzles and a respective plurality of actuators, wherein the voltage is applied individually to each of the actuators, and wherein the system comprises a data processor having a circuit configured for detecting variations in dispensing capability among the nozzles.

According to some embodiments of the invention the detecting the variations in the dispensing capability is by comparing the change in the amount of liquid in the print head among individual nozzles.

According to some embodiments of the invention the detecting the variations in the dispensing capability is by comparing the change in the amount of liquid in the print head among groups of nozzles.

According to some embodiments of the invention the controller is configured for receiving printing data describing an object and controlling the print head to print of the object based on the printing data, and wherein the applying the voltage to the actuator to eject the liquid material formulation through the nozzle is executed based on the printing data to form part of the object.

According to some embodiments of the invention the controller is configured for varying the voltage according to at least one of a calibration curve and a lookup table.

According to some embodiments of the invention the sensor is a liquid level sensor.

According to some embodiments of the invention the method wherein the liquid level sensor is a multi-level sensor having at least two sensing elements at a fixed height difference therebetween.

According to some embodiments of the invention the sensor is a pressure sensor.

According to some embodiments of the invention the variation of the voltage is according to at least one of a calibration curve and a lookup table.

According to some embodiments of the invention the printing system is a two-dimensional printing system.

According to some embodiments of the invention the printing system is a three-dimensional printing system.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention;

FIGS. 3A-E are schematic illustrations of printing heads according to some embodiments of the present invention;

FIG. 4 is a flowchart diagram of a method of calibrating a print head of a printing system according to various exemplary embodiments of the present invention;

DESCRIPTION OF SPECIFIC EMBODIMENTS OF THE INVENTION

Figure 1A:
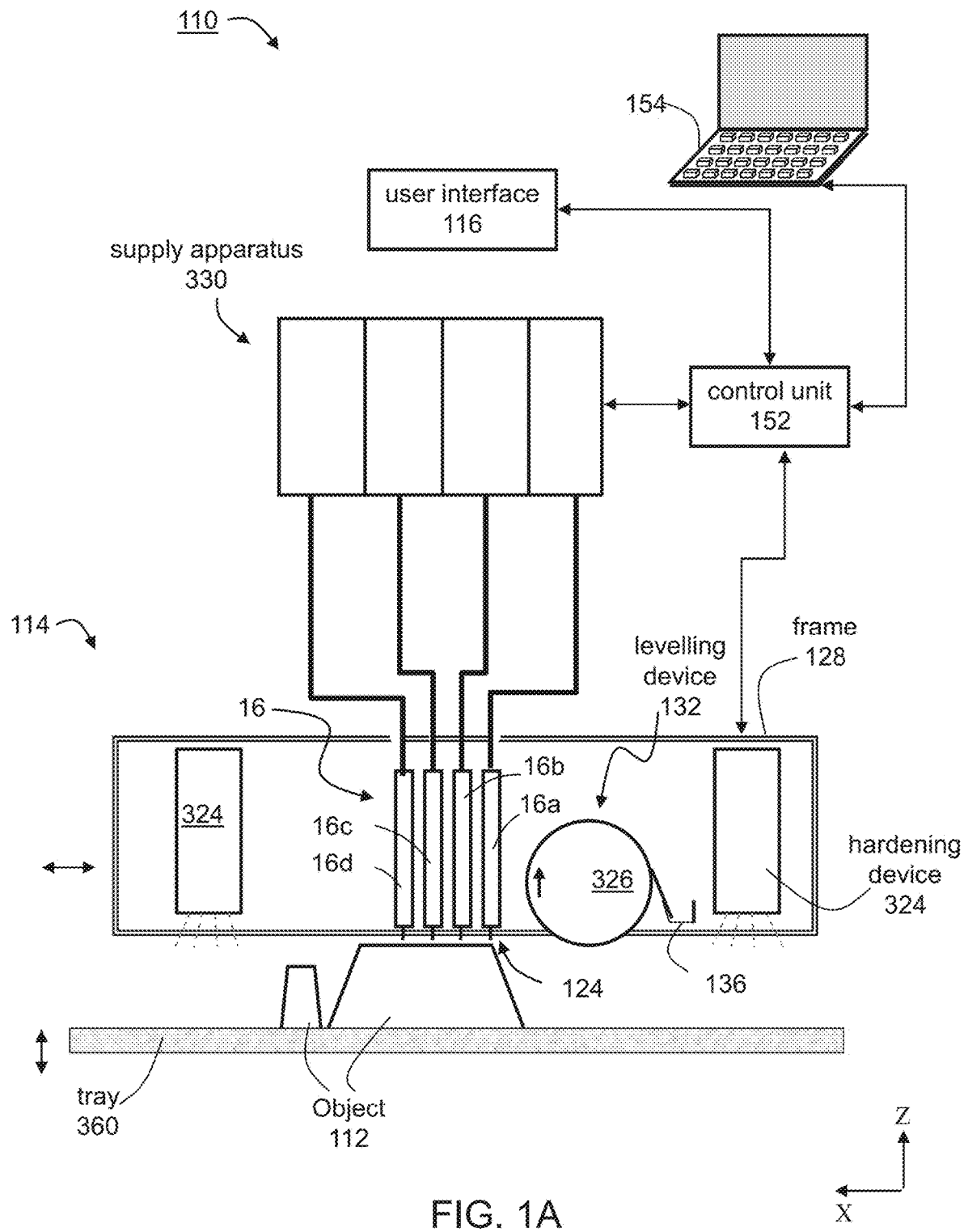

The present invention, in some embodiments thereof, relates to printing and, more particularly, but not exclusively, to a print head, e.g., a print head of a three-dimensional printing system, and method of calibrating the print head.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments can be utilized for printing, optionally and preferably inkjet printing. In some embodiments of the present invention the method and system print two-dimensional objects on a receiving substrate, and in some embodiments of the present invention the method and system manufacture three-dimensional objects in a layerwise manner by forming a plurality of layers in a configured pattern corresponding to the shape of the objects. While the embodiments below are described with more emphasis on three-dimensional printing, it is to be understood that two-dimensional printing is also contemplated.

The printing is based on printing data. When three-dimensional printing is employed, the printing data include computer object data which can be in any known format, such as, but not limited to, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object (2D or 3D) or a part thereof.

In three-dimensional printing, each layer is formed by additive manufacturing (AM) apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by a building material formulation, and which type of building material formulation is to be delivered thereto. The decision is made according to a computerized image of the layer or surface.

In preferred embodiments of the present invention, the AM comprises three-dimensional inkjet printing. In these embodiments a liquid building material formulation is dispensed from a dispensing head having a set of nozzles to deposit droplets of building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulation can be categorized into two major categories: modeling material formulation and support material formulation. The support material formulation serves as a supporting construction for supporting the object or object parts during the fabrication process and/or other purposes, e.g., for providing hollow or porous objects. Support constructions may additionally include modeling material elements, e.g. columns, bars, to provide a support matrix, for further support construction strength and/or stability.

The modeling material formulation is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling material formulations, each material formulation from a different dispensing head of the AM. The material formulations are optionally and preferably deposited in layers during the same pass of the print heads over the working surface. The material formulations and/or combination of material formulations within the layer are selected according to the desired properties of the object being formed.

A representative and non-limiting example of a printing system 110 according to some embodiments of the present invention is illustrated in FIG. 1A. System 110 comprises an apparatus 114 configured for additive manufacturing and having a dispensing unit 16 which comprises a plurality of dispensing heads. Each head preferably comprises an array of one or more nozzles 122, as illustrated in FIGS. 3A-E described below, through which a liquid material formulation (e.g., a building material formulation) 124 is dispensed. Preferably, but not obligatorily, apparatus 114 is a three-dimensional inkjet printing apparatus, in which case the dispensing heads are inkjet print heads, and the building material formulation is dispensed via inkjet technology.

Each dispensing head is optionally and preferably fed via a building material formulation reservoir which may optionally include a temperature control unit (e.g., a temperature sensor and/or a heating device), and a material level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

The overall number of dispensing nozzles or nozzle arrays is preferably selected such that some of the dispensing nozzles or nozzle arrays are designated to dispense support material formulation and some of the dispensing nozzles or nozzle arrays are designated to dispense modeling material formulation. In the representative example of FIG. 1A, four dispensing heads 16a, 16b, 16c and 16d are illustrated. Each of heads 16a, 16b, 16c and 16d has a nozzle array. Heads 16a and 16b can be designated for modeling material formulation formulation(s) and heads 16c and 16d can be designated for support material formulation(s). Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation.

Yet it is to be understood that it is not intended to limit the scope of the present invention and that the number of modeling material formulation depositing heads (referred to for simplicity as "modeling heads") and the number of support material formulation depositing heads (referred to for simplicity as "support heads") as well as the combinations of printing heads may differ.

Apparatus 114 can further comprise a solidifying device 324 which can include any device configured to emit light, heat or the like that may cause the deposited material to harden. For example, solidifying device 324 can comprise one or more radiation sources, which can be, for example, an ultraviolet or visible or infrared lamp, or other sources of electromagnetic radiation, electron beam source, light emitting diode (LED), digital light processing (DLP) system, depending on the modeling and/or support material formulations being used. In some embodiments of the present invention, solidifying device 324 serves for curing or solidifying the modeling and/or support material formulation.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure, harden or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to a predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out for example in order to cause contact of the leveling device with the surface in one direction and prevent contact in the other direction.

System 110 optionally and preferably comprises a building material formulation supply system 330 which comprises the building material containers or cartridges and supplies a plurality of building materials to fabrication apparatus 114.

A controller 340 controls fabrication apparatus 114 and optionally and preferably also supply system 330. The controller can comprise an electronic circuit and a non-volatile memory medium readable by the circuit, wherein the memory medium stores program instructions which, when read by the circuit, cause the circuit to perform control operations as further detailed below. Controller 340 preferably communicates with a data processor 154 such as a host computer which transmits digital data pertaining to fabrication instructions based on computer object data, e.g., a CAD configuration represented on a computer readable medium in a form of a Standard Tessellation Language (STL) format or the like. Typically, controller 340 controls the voltage applied to each dispensing head or nozzle array and the temperature of the building material formulation in the respective print head.

Once the manufacturing data is loaded to controller 340 it can operate without user intervention. In some embodiments, controller 340 receives additional input from the operator, e.g., using data processor 154 or using a user interface 116 communicating with unit 340. User interface 116 can be of any type known in the art, such as, but not limited to, a keyboard, a touch screen and the like. For example, controller 340 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1D:
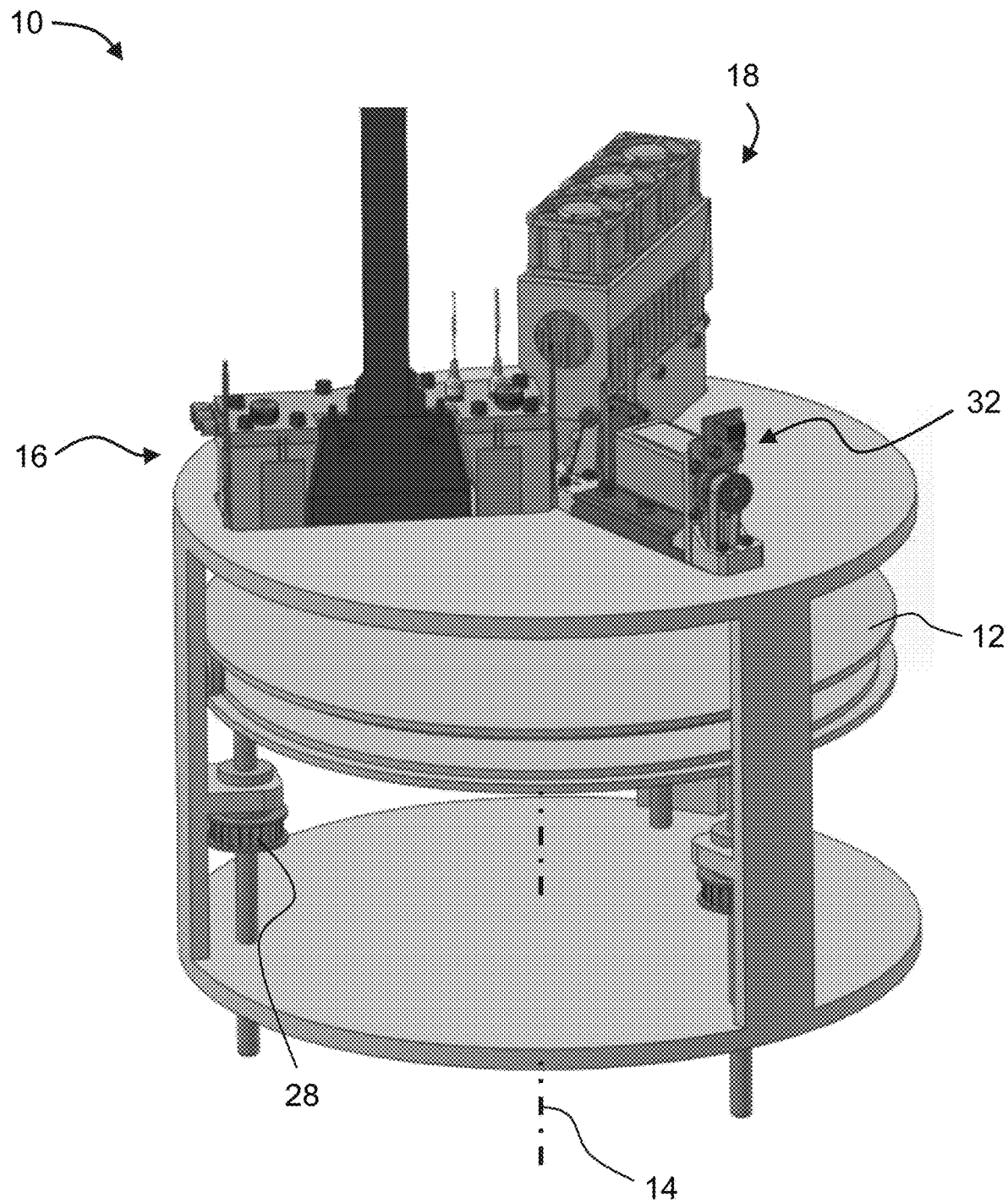

Another representative and non-limiting example of a printing system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet print heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skill in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a print head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working surface on which one or more objects are printed is typically, but not necessarily, smaller than the total area of tray 12. In some embodiments of the present invention the working surface is annular. The working surface is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet print heads 16 operate. In configurations in which print heads 16 rotate about axis 14, support structure 30 preferably also rotates such that support structure 30 is always directly below heads 16 (with tray 12 between heads 16 and tray 12).

Tray 12 and/or print heads 16 is optionally and preferably configured to move along the vertical direction z, parallel to vertical axis 14 so as to vary the vertical distance between tray 12 and print heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet print heads 16 and optionally and preferably also of one or more other components of system 10, e.g., the motion of tray 12, are controlled by a controller 20. The controller can comprise an electronic circuit and a non-volatile memory medium readable by the circuit, wherein the memory medium stores program instructions which, when read by the circuit, cause the circuit to perform control operations as further detailed below.

Controller 20 can also communicate with a data processor 24 such as a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, data processor 24 can transmit the fabrication instructions in terms of the original system of coordinates as provided by the computer object data, in which case the transformation of coordinates is executed by the circuit of controller 20.

Figure 2A:
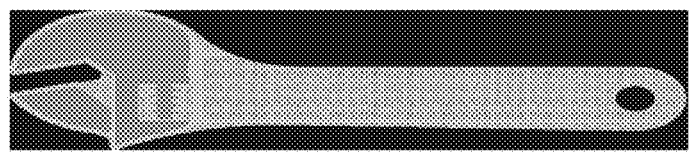
FIGS. 2A and 2B are schematic illustrations demonstrating coordinate transformations according to some embodiments of the present invention.
Figure 2B:
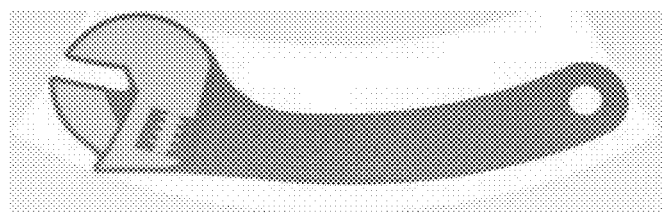

The transformation of coordinates allows three-dimensional printing over a rotating tray. In conventional three-dimensional printing, the print heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 2A-B, showing three slices of an object (each slice corresponds to fabrication instructions of a different layer of the objects), where FIG. 2A illustrates a slice in a Cartesian system of coordinates and FIG. 2B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls print heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling and/or support material formulations being used. Radiation source can include any type of radiation emitting device, including, without limitation, light emitting diode (LED), digital light processing (DLP) system, resistive lamp and the like. Radiation source 18 serves for curing or solidifying the modeling and/or support material formulations. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. Leveling device 32 can optionally and preferably serve also to maintain a pre-determined and consistent layer thickness from layer to layer e.g. by removal of excess building material from the surface of the layer. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention print heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select materials from a given number of materials and define desired combinations of the selected materials and their properties. According to the present embodiments, the spatial locations of the deposition of each material formulation within the layer is defined, either to effect occupation of different three-dimensional spatial locations by different material formulations, or to effect occupation of substantially the same three-dimensional location or adjacent three-dimensional locations by two or more different material formulations so as to allow post-deposition spatial combination of the materials within the layer, at the respective location or locations.

Any post-deposition combination or mix of modeling materials is contemplated. For example, once a certain material formulation is dispensed it may preserve its original properties. However, when it is dispensed simultaneously with another modeling material formulation or other dispensed material formulations which are dispensed at the same or in nearby locations, a composite material having a different property or properties to each of the dispensed material is formed.

The present embodiments thus enable the deposition of a broad range of material combinations, and the fabrication of an object which may consist of multiple different combinations of materials, in different parts of the object, according to the properties desired to characterize each part of the object being built.

Further details on the principles and operations of an AM system suitable for the present embodiments are found in U.S. Published Application No. 20100191360, the contents of which are hereby incorporated by reference.

Exemplified embodiments for the print head 16 are illustrated in FIGS. 3A-3E. These embodiments can be employed for any of the AM systems described above, including, without limitation, system 110 and system 10.

Figure 3A:
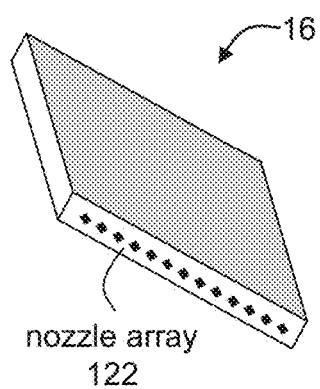
Figure 3B:
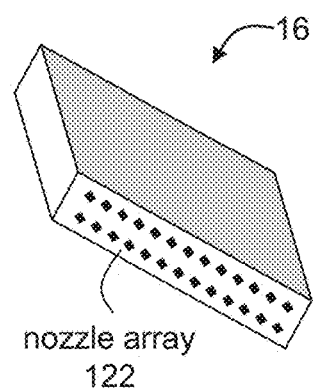

FIGS. 3A-B illustrate a print head 16 with one (FIG. 3A) and two (FIG. 3B) nozzle arrays 22. The nozzles in the array are preferably aligned linearly, along a straight line. In embodiments in which a particular print head has two or more linear nozzle arrays, the nozzle arrays are optionally and preferably can be parallel to each other.

When a system similar to system 110 is employed, all print heads 16 are optionally and preferably oriented along the indexing direction with their positions along the scanning direction being offset to one another.

When a system similar to system 10 is employed, all print heads 16 are optionally and preferably oriented radially (parallel to the radial direction) with their azimuthal positions being offset to one another. Thus, in these embodiments, the nozzle arrays of different print heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

Figure 3C:
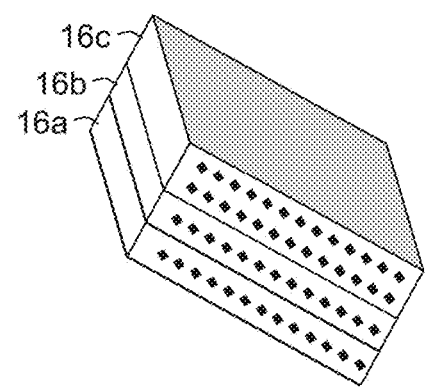

In some embodiments, two or more print heads can be assembled to a block of print heads, in which case the print heads of the block are typically parallel to each other. A block including several inkjet print heads 16a, 16b, 16c is illustrated in FIG. 3C.

FIG. 3D is a schematic illustration of print head 16 in embodiments of the invention in which print head 16 comprises a liquid level sensor according to some embodiments of the present invention. Print head 16 comprises a compartment 56 for holding liquid material therein. When head 16 is used for three-dimensional printing the liquid material is a building material formulation, and when head 16 is used for two-dimensional printing the liquid material is preferably ink or any other formulation suitable for 2D printing. Head 16 preferably comprises an inlet port 60 through which the liquid material formulation enters compartment 56 (for example, from one of the containers in apparatus 330). Inlet port 60 is preferably controllable by the controller of the printing system, for example, by means of a valve or the like, so that entry of new liquid material formulation into compartment 56 can be prevented or allowed, as desired.

Head 16 comprises one or more nozzles or nozzle array 122 in direct fluid communication with compartment 56, and an actuator or actuator array 58 for ejecting the liquid through nozzle(s) 122 in response to voltage applied to actuator 58. Actuator 58 can be of any type known to be suitable for inkjet printing, including, without limitation, a piezoelectric actuator, an electrostatic membrane, a mechanical or impact driven membrane, a magneto-strictive drive, a thermal resistor and the like.

Head 16 can further comprise a liquid level sensor 50 within compartment 56 or within a channel or a chamber in fluid connection with compartment 56. Preferably, liquid level sensor 50 has two or more sensing elements 52, 54 at a fixed height difference Δh therebetween. Sensor 50 communicates with the controller of the printing system (not shown) and transmits to the controller signals pertaining to the level of the liquid in compartment 56.

The advantage of having two or more sensing elements for sensor 50 is that it allows quantifying a change in the liquid level within compartment 56. This is particularly useful for estimating the volume of liquid material formulation that is dispensed out of nozzles(s) 122. For example, suppose that before applying voltage to actuator 58 both sensing elements 52, 54 sense the liquid material in compartment 56. Suppose further that voltage is applied to actuator 58 such that nozzles(s) 122 eject n drops of liquid material formulation while input port 60 is closed for entry of new liquid material and that after the ejection none of sensing elements 52, 54 senses the liquid material in compartment 56. In this scenario, the volume of each ejected drop approximately equals at least $\Delta hA/n$, where A is the area of container 56. In a scenario in which after the ejection of n drops while input port 60 is closed for entry of new liquid material only the sensing element at the lower height (element 52 in FIG. 3D) senses the liquid material in compartment 56, the volume of each ejected drop approximately equals less than $\Delta hA/n$. Thus, the sensing elements 52 and 54 of sensor 50 can serve as a tool for measuring an estimate of the volume of the drops that head 16 ejects. It is appreciated that adding more sensing elements to sensor 50 can increase the accuracy of the measurement.

FIG. 3E is a schematic illustration of print head 16 in embodiments of the invention in which print head 16 comprises a pressure sensor according to some embodiments of the present invention. The print head in FIG. 3E can be the same as the print head described above with reference to FIG. 3D, except that sensor 50 comprises a pressure sensor 62, which communicates with the controller of the printing system (not shown) and transmits to the controller signals pertaining to the pressure in compartment 56 or in a channel or chamber in fluid communication with compartment 56. Although FIG. 3E does not show a liquid level sensor, this need not necessarily be the case, since, for some applications, it may be desired to have both a pressure sensor and a liquid level sensor with two or more sensing elements 52, 54 as further detailed hereinabove.

When sensor 50 comprises a pressure sensor, the signal generated by the sensor can be used by the controller or the data processor of the printing system for estimating the volume of liquid material that is dispensed out of nozzles(s) 122. The total volume of compartment 56 is fixed and is occupied by liquid material and gas (e.g., air). The volume of compartment 56, $V_{tot}$, the volume of the liquid material in container 56, $V_L$, and the volume of the gas in container 56, $V_G$, satisfy the relation $V_{tot}=V_L+V_G$, where $V_{tot}$ is generally known. When input port 60 is closed any change in the volumetric ratio $V_G/V_L$ between the volumes of the gas and liquid results in a change of at least one of the temperature and gas pressure in compartment 56. It is appreciated that during the dispensing of a few drops out of compartment 56, the relative change of temperature $\Delta T/T_0$ (where $\Delta T$ is the change in temperature and $T_0$ is the initial temperature, both measured in Kelvin degrees) is much smaller than the relative change of the pressure, and can thus be neglected. Therefore, a change in the gas pressure within compartment 56 is correlative to a change in the volumetric ratio $V_G/V_L$.

Consider scenario in which sensor 50 senses in compartment 56 a gas pressure $P_1$ before applying voltage to actuator 58 and a gas pressure $P_2$ after the ejection of n drops by applying voltage to actuator 58 while input port 60 is closed for entry of new liquid material. For typical thermodynamic conditions in a print head, the gas can be practically considered as obeying the equation of state of an ideal gas. Since the amount of gas in the container does not change, $P_1$ and $P_2$ satisfy the relation $P_1V_{G1}/T_1=P_2V_{G2}/T_2$, where $V_{G1}$, $T_1$, $V_{G2}$ and $T_2$, are the volumes ($V_{G1}$, $V_{G2}$) and temperatures ($T_1$, $T_2$) of the gas before ($V_{G1}$, $T_1$) and after ($V_{G2}$, $T_2$) the ejection.

Under the aforementioned approximation that the change in the temperature is negligible, the relation between the sensed pressures and the gas volumes is $P_1/P_2=V_{G2}/V_{G1}$, so that change in the gas volume (hence also in the liquid volume, since $V_{tot}$ is fixed and known) can be determined from the measured values of the gas pressure. When the volume $V_{G1}$ of the gas or the volume $V_{L1}$ of the liquid before the ejection is known, the volume $V_{G2}$ of the gas (hence also the volume $V_{L2}$ of the liquid) after the ejection can be calculated as $V_{G2}=V_{G1}P_1/P_2$, and the approximate volume of a single drop can be calculated as $(V_{L1}-V_{L2})/n$ or $(V_{G2}-V_{G1})/n$. However, such input is rarely attainable. In such cases, the change in the volume of liquid within compartment 56 can be estimated using a suitable calibration curve that can be constructed empirically. A representative example of such a curve is $V_{drop}=F(n,\Delta P)$, where $V_{drop}$ is the volume of a single drop, $\Delta P=P_2-P_1$, and F is a function that is constructed empirically. In some embodiments of the present invention, for a given n, F is a linear function of $\Delta P$ with coefficients (slope and intersection) that are determined experimentally.

When sensor 50 comprises a pressure sensor, signals received it can also be used by the controller both in a calibration mode, wherein the signals are used for estimating the volume of liquid material that is dispensed out of the nozzles(s) as further detailed hereinabove, and in three-dimensional fabrication mode, wherein the signals are used for reducing the risk of building material leaking. In the three-dimensional fabrication mode, the controller optionally and preferably controls the pressure within compartment 56 such that the gas pressure remains generally constant (e.g., with a tolerance of less than 10% of $P_1$) during the fabrication. In these embodiments, a pump (not shown) or other gas sink-source system that is in fluid connection with compartment 56 is typically controlled by the controller to increase or decrease the pressure such as to ensure a generally constant gas pressure within compartment 56. For example, when the gas pressure varies following dispensing of building material out of compartment 56 or following entry of building material to be dispensed into compartment 56, the controller can signal the pump to introduce or evacuate gas into or out of compartment 56, as appropriate, in order to maintain a generally constant gas pressure.

The volume of a single drop can also be determined without neglecting the change in temperature. In these embodiments, head 16 also comprises a temperature sensor 64 which communicates with the controller of the printing system (not shown) and transmits to the controller signals pertaining to the temperature in compartment 56. The sensed values of the temperature $T_1$, $T_2$ can then be used in the relation $P_1V_{G1}/T_1=P_2V_{G2}/T_2$ for determining the change in gas volume and therefore also the change in the volume of liquid in compartment 56. Alternatively, the change in the volume of liquid within compartment 56 can be estimated using an empirically constructed calibration curve that relates the volume of a single drop for a given value of n to the change in pressure and the change in temperature.

The determination of the volume of the ejected drops is particularly useful for calibration. In inkjet printing, and in particular in three-dimensional inkjet printing, it is oftentimes desired to recalibrate the voltage applied to the actuator or actuators 58 so as to achieve a predetermined volume of the ejected drops.

In 3D priming the drop volume of drops of the liquid material is oftentimes inconsistent. For example, throughout a building process, purging and wiping of the print heads may be periodically performed. These processes may lead to an accumulation of excess cured material on the print head itself, in and/or around one or more nozzles, between print heads and/or other parts of the printing system.

Such accumulation of cured material, in conjunction with ambient radiation, may cause various problems, for example, blockage of one or more nozzles in the print head. A major result of such problems is that one or more print heads may become ineffective or damaged, entirely or to a certain extent, and there may be a need to replace such defective print heads.

Additionally or alternatively, one or more nozzles on a print head may be partially or completely blocked. If one or more of the nozzles in the array is blocked or is partially blocked or impaired, the affected nozzle or nozzles may not deposit the required amount of interface material, and in some cases may not deposit any material at all. This may result in a repeated lack of material deposit at a specific point or points or in specific locations, resulting in imperfections in the 3-D model at the position of, or along the axis of movement of, the problematic nozzle or nozzles.

Additionally, the actuator of the print head may show a degradation in efficiency with time, for example, due to a weakening of the piezo elements. Such degradation may cause, for example, a decrease in drop volume or drop weight, and/or non-uniformity in drop volume or drop weight Further, since the volume of an ejected drop may vary with its viscosity, the voltage that is required to eject a predetermined volume for one liquid material may differ from the voltage that is required to eject the same predetermined volume for another liquid material.

Conventional techniques for measuring the drop volume is by placing drops of the liquid material on a scale or load cell, measuring the weight of the drops ad dividing by the number of drops. The present inventors found that this process is costly and technologically difficult to employ, and have therefore devised a technique that is based on the signals received from sensor 50.

Thus, sensor 50 advantageously allows recalibrating the voltage when the operator replaces the liquid material (e.g., by connecting input port 60 to a different container of apparatus 330). Sensor 50 advantageously allows performing recalibration procedures for recalibrating the voltage at predetermined time intervals, thus ensuring that the volume of drops ejected by head 16 remains approximately the same over time. An additional example is when head 16 is replaced by a head of a different type (e.g., different actuation mechanism) or different properties (e.g., different nozzle diameter) or different manufacturer or different age. In these cases, sensor 50 can be used for calibrating head 16 following the replacement, so that the volume of drops ejected by head 16 after the replacement remains approximately the same as the volume of drops ejected by head 16 before the replacement.

The determination of the volume of the ejected drops can also be used for monitoring the dispensing capabilities of the various nozzles. For example, the controller can apply voltage only to an individual nozzle and determine the change in liquid volume within compartment 56. Since only the individual nozzle ejected the drops, the change in liquid volume is indicative of the drop volume that is ejected by that individual nozzle. This can similarly be done for a group of nozzles. Specifically, the controller can apply voltage only to nozzles belonging to a selected group of nozzles and determine the change in liquid volume within compartment 56. Since only the selected group of nozzles ejected the drops, the change in liquid volume is indicative of the average drop volume that is ejected by a nozzle within the selected group.

The controller can then then apply voltage to another individual nozzle (or another selected group of nozzles), determine the volume of liquid ejected by that nozzle, and compare between the volume as determined form one individual nozzle (or a nozzle within one selected group) and the volume as determined form another individual nozzle (or a nozzle within anther selected group). The comparison can be used to determine which of the nozzles is capable of ejecting larger drops. Alternatively, the controller can apply voltage to individual nozzle and determine the volume of liquid ejected by that nozzle, and compare this volume to a predetermined volume threshold. The comparison can be used to determine whether the nozzle is capable of ejecting drops at a predetermined volume.

Any determination of the drop volume can be executed for a single nozzle, or for a group of nozzles, as desired. An exemplified procure is the determination of the drop volume ejected by a single nozzle, a separate determination of the average drop volume ejected by each of a group of nozzles, and a comparison between the volume ejected by a single nozzle and the average volume.

Following is a description of a method suitable for calibrating a print head of a printing system, and a method suitable for printing, according to some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

FIG. 4 is a flowchart diagram of a method of calibrating a print head of a printing system according to various exemplary embodiments of the present invention. The method can be executed for calibrating a print head of a two-dimensional printing system or a three-dimensional printing system. For example, the method can be executed for calibrating print head 16.

The method begins at 70 and continues to 71 at which voltage is applied to the print head to effect a dispensing of the liquid material from the print head. For example, the voltage can be applied by the controller of the printing system to the actuator of the print head. The method continues to 72 at which a signal correlative to a change in an amount of liquid in the print head is received directly from a sensor within the print head (e.g., from sensor 50 within print head 16). The method optionally and preferably continues to 73 at which a change in the amount of liquid within the print head is estimated based on the received signal. For example, when the signal is generated by a liquid level sensor the determination can be based on a change in the level of liquid as further detailed hereinabove, and when the signal is generated by a pressure sensor, and optionally also a temperature sensor, the determination can be based on a change in the gas pressure and optionally temperature within the print head as further detailed hereinabove.

The method continues to 74 at which the voltage applied to the print head is varied to calibrate the head. When operation 73 is executed, the voltage can be varied based on the estimated change in the amount of liquid. Specifically, the estimated change can be compared to a predetermined threshold range (e.g., a predetermined drop volume threshold range). When the estimated amount is above the upper limit of the threshold range, the voltage can be varied to reduce the ejected amount, and when the estimated amount is below the lower limit of the threshold range the voltage can be varied to reduce increase the ejected amount.

It is appreciated that since the signal generated by the sensor is indicative of the change in the amount of liquid in the print head, it is not necessary to explicitly determine the change in the amount of liquid. Rather, the variation can be based on a thresholding procedure that is applied to the signal itself (e.g., the amplitude of the signal) without explicitly calculating the liquid volumes or change in liquid volume. Thus, for example, signal's amplitude can be compared to a predetermined threshold range of amplitudes. When the signal's amplitude is above the upper limit of the threshold range, the voltage can be varied to reduce the ejected amount, and when the estimated amount is below the lower limit of the threshold range the voltage can be varied to reduce increase the ejected amount.

The method can then loop back to 71 are repeat the operations, optionally and preferably until the estimated amount (or the signal itself, e.g., the signal's amplitude) is within the threshold range, in which case the method continues to 75 at which it ends.

Figure 5:
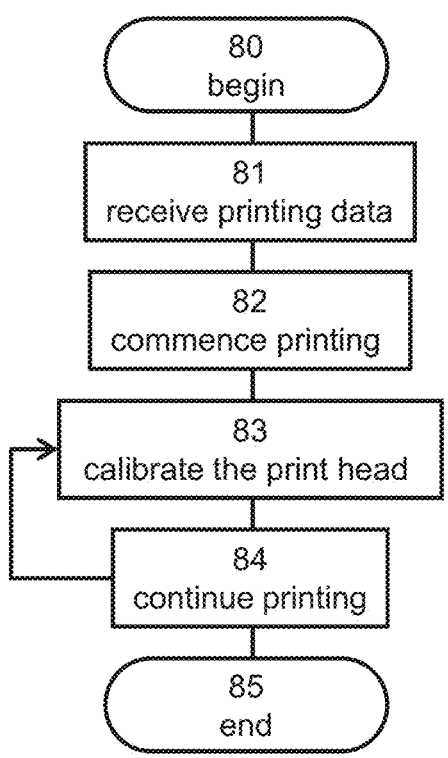
FIG. 5 is a flowchart diagram of a method suitable for printing an object according to various exemplary embodiments of the present invention.

FIG. 5 is a flowchart diagram of a method suitable for printing an object according to various exemplary embodiments of the present invention. The method can be executed for printing a two-dimensional object or a three-dimensional object. For example, the method can be executed using system 10 or system 110.

The method begins at 80 and continues to 81 at which printing data describing the object is received. The printing data can be in a format suitable for two-dimensional or three-dimensional printing, depending on the type of system that is employed for the printing. The method continues to 82 at which the printing of the object is commenced by dispensing liquid material from one or more print heads, such as, but not limited to, print head 16, based on the printing data that describes the object.

The method continues to 83 at which the print head is calibrated, optionally and preferably using selected operations of method 70 described above. The calibration is optionally and preferably executed such that the drops of liquid material that are ejected during the calibration are used for printing part of the object, namely they are ejected based on the printing data that describe the object. This is unlike conventional techniques in which the drops for calibration are ejected before the object's printing process is commenced, and in any event away from the printed object.

The method continues to 84 at which the printing of the object is continued after the calibration. Optionally, the method loops back to 83 for recalibrating the print head one or more times during the printing process.

The method ends at 85.

It is expected that during the life of a patent maturing from this application many relevant printing technologies will be developed and the scope of the term print head is intended to include all such new technologies a priori.

As used herein the terms "about" and "approximately" refer to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Figure 6A:
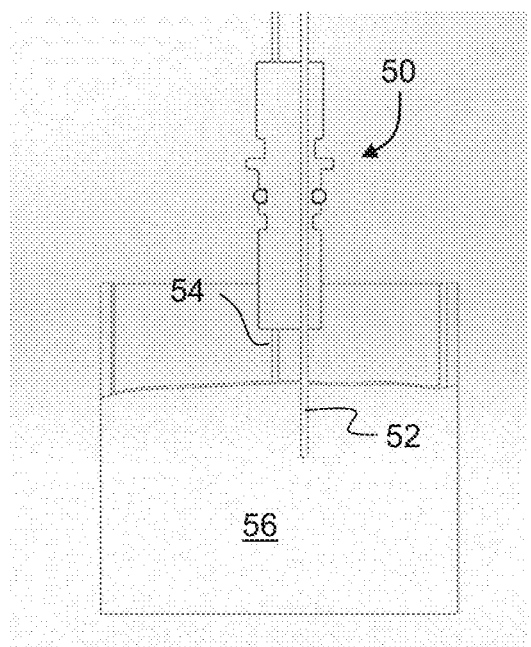
FIGS. 6A and 6B are schematic illustrations of a liquid level sensor with two sensing elements, according to some embodiments of the present invention.
Figure 6B:
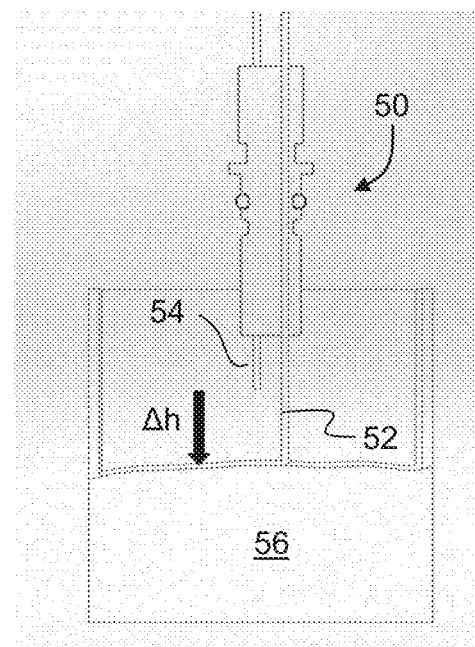

FIGS. 6A-B and 7A-C illustrate liquid level sensor 50 with sensing elements 52, 54 (FIGS. 6A and 6B) and flowchart diagrams (FIG. 7A-C) describing a first (FIG. 7A) a second (FIG. 7B) and a third (FIG. 7C) representative implementations of a technique for calibrating a print head according to some embodiments of the present invention. The height distance between elements 52 and 54 is designated in FIGS. 6A and 6B by Δh. FIGS. 6A and 6B show elements 52, 54 within chamber 56, but this need not necessarily be the case, since elements 52, 54 can, as stated, be in any chamber fluidly connected with chamber 56. Further, for clarity of presentation, other components of the printing head are not shown in FIGS. 6A and 6B.

Figure 7A:
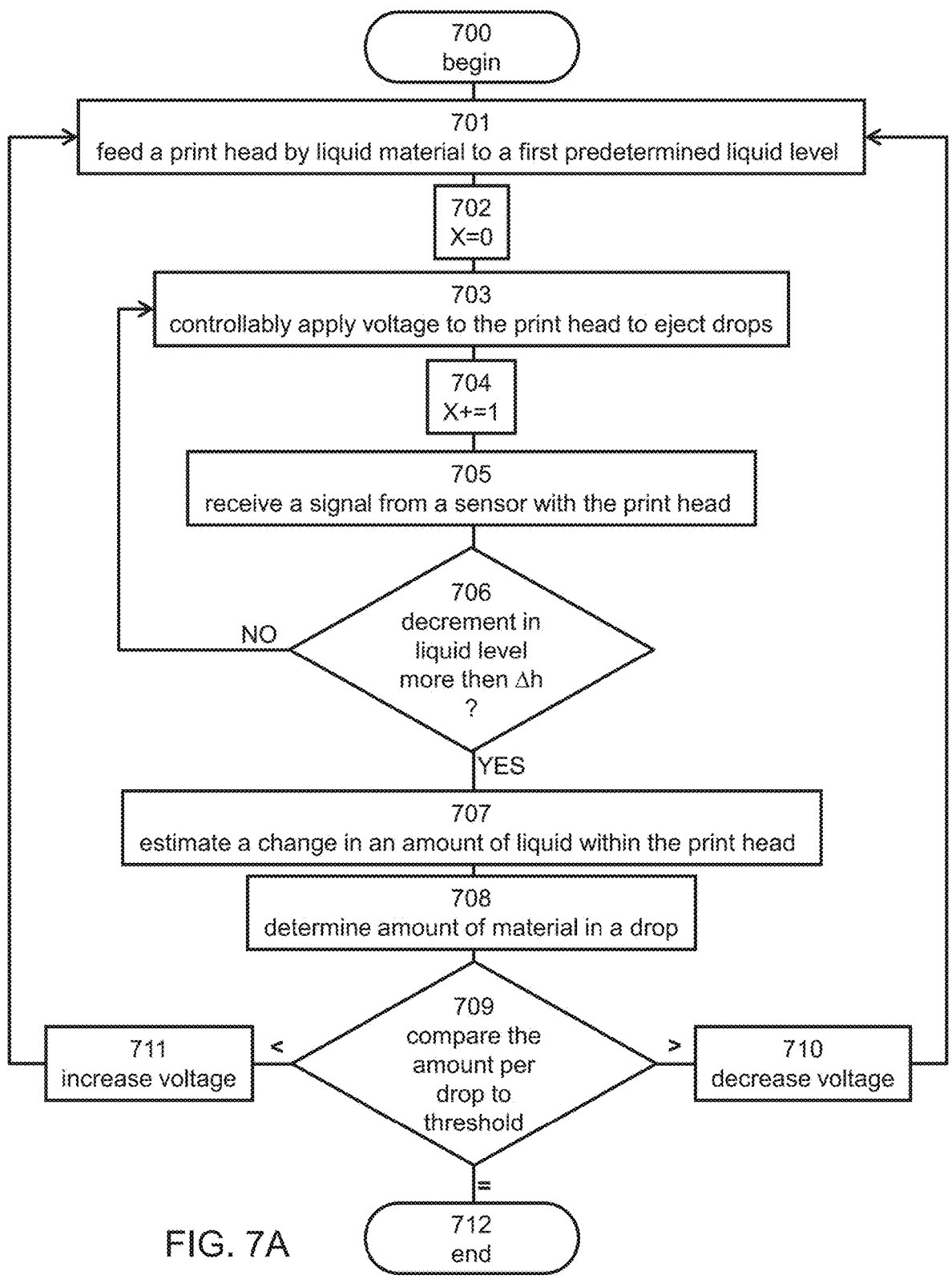
FIGS. 7A-C are flowchart diagrams describing representative implementations of a technique for calibrating a print head according to some embodiments of the present invention.

Referring to FIGS. 6A, 6B and 7A, in this representative implementation the method begins at 700, and continues to 701 at which the head is fed by liquid material to a first predetermined liquid level. This can be done by allowing the liquid material to flow, for example, from supply apparatus 330, into the print head until a signal received from sensor 50 indicates that there is a contact between the liquid material and both elements 53 and 54 (see FIG. 6A).

The method continues to 702 at which drop counting parameter X is set to zero. At 703 voltage is controllably applied to the print head to eject drops. Preferably, the voltage is applied intermittently such as to generate drop-by-drop jetting from the nozzles of the print head. At 704 the drop counting parameter X is increased by 1. At 705, signal is received from sensor 50. The method then continues to decision 706 at which the method determines whether or not the decrement in the liquid level is more than Δh. This can be done by determining whether there is still contact between the liquid and element 52 (FIG. 6B). If there is still contact, the method determines that the decrement in the liquid level is not more than Δh, and loops back to 703 to eject another drop of material, increase 704 the value of X by 1, and receive 705 a signal from sensor 50. If there is no contact between the liquid and element 52, the method determines that the decrement in the liquid level is more than Δh, and continues to 707 at which the change in the amount of liquid in the head (e.g., a volumetric change ΔV) is determined. This is optionally and preferably done by setting the change to be equal to the amount of liquid that can occupy a volume of high Δh between elements 52 and 54. For example, in the simplified scenario in which elements 52 and 54 are with chamber 56 and chamber 56 has a shape of a cylinder of radius R, the volumetric change ΔV can be set to $\pi R^2$. It is to be understood that the mass change of the liquid can be equivalently calculated by multiplying the volumetric change ΔV by the density of the liquid.

From 707 the method optionally and preferably proceeds to 708 at which amount of material (e.g., volume) of a drop is determined. This can be done by devising the amount estimated at 707 by the value of the parameter X. For example, the method can determine at 708 that the volume of a drop is ΔV/X. The mass of the liquid can be equivalently calculated by multiplying the volume of the drop by the density of the liquid.

The method can proceed to decision 709 at which the method compares the amount of material in the drop to a predetermined threshold. If the amount of material in the drop is above the predetermined threshold, the method optionally and preferably continues to 710 at which the method decreases the voltage to be applied to the print head, if the amount of material in the drop is less than the predetermined threshold, the method optionally and preferably continues to 711 at which the method increases the voltage to be applied to the print head. From 711 or 710, as the case may be, the method optionally and preferably loops back to 701. If the amount of material in the drop is the same or approximately the same as the predetermined threshold, the method continues to 712 at which it ends.

Figure 7B:
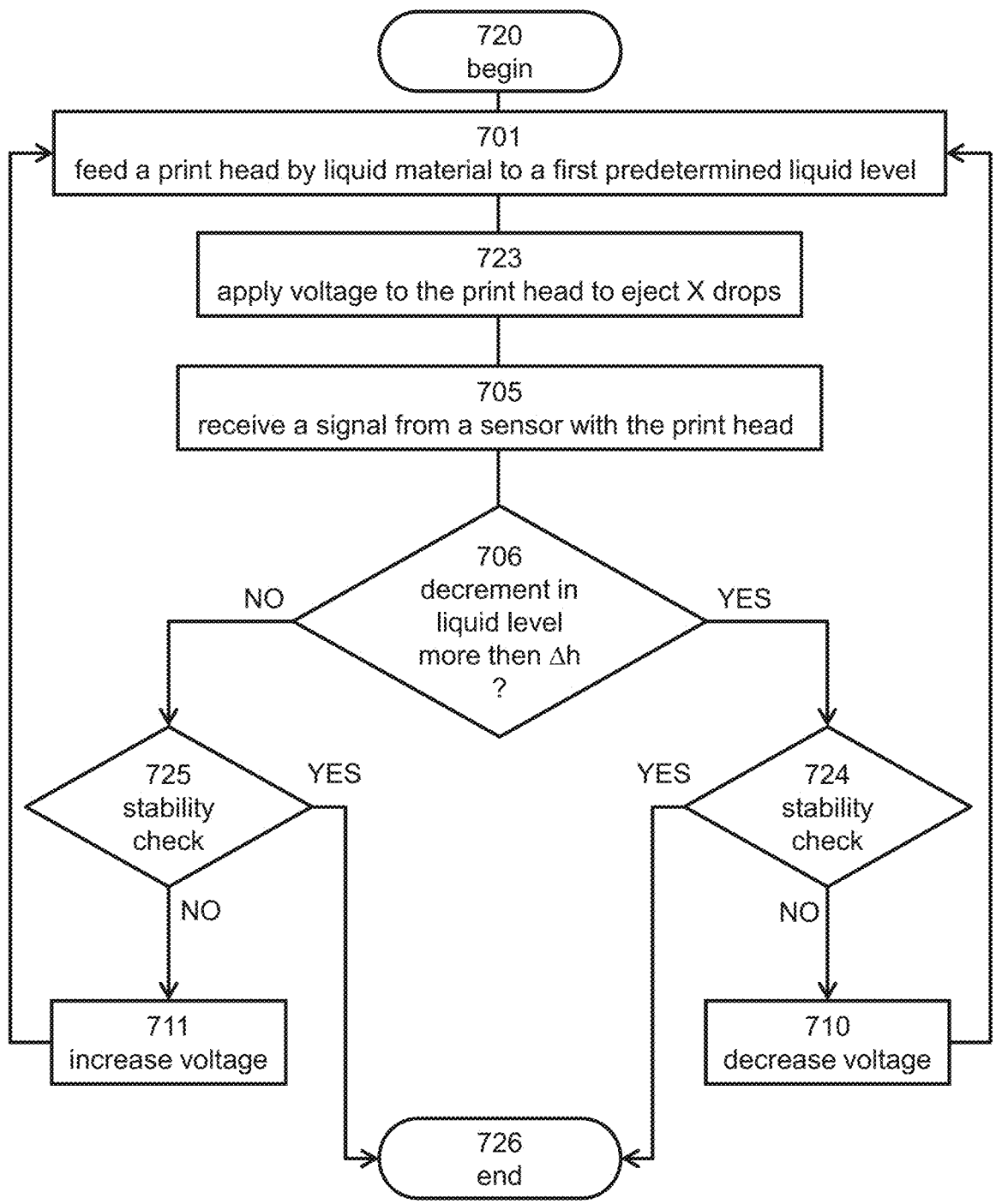

Referring to FIGS. 6A, 6B and 7B, in this representative implementation the method begins at 720, and continues to 701 at which the head is fed by liquid material to a first predetermined liquid level, as further detailed hereinabove (see FIG. 6A). At 723 voltage is applied to the print head to eject a predetermined number of X drops. The voltage in this implementation is optionally and preferably varied dynamically until the jetting of X drops results in a change of Δh in the height of the liquid. A representative procedure for such dynamic variation will now be described, but it is to be understood that alternative procedures can be employed.

At 705, signal is received from sensor 50, and at decision 706 the method determines whether or not the decrement in the liquid level is more than Δh, as further detailed hereinabove. If the decrement in the liquid level is not more than Δh, the method optionally and preferably continues to a stability check decision 724 and if the decrement in the liquid level is more than Δh, the method optionally and preferably continues to a stability check decision 725. At stability check decisions 724 and 725, the method determines whether the decrement in height is stable, within a predetermined tolerance (e.g., 10%), compared to a previous iteration. If the decrement in height is stable within the tolerance, the method continues to 726 at which it ends. If the decrement in height is not-stable within the tolerance, then the method continues to 710 (from 724) or 711 (from 725) at which the method decreases (at 710) or increases (at 711) the voltage to be applied to the print head. From 711 or 710, as the case may be, the method optionally and preferably loops back to 702. The change in voltage 710 and 711 is optionally and preferably varied dynamically at each iteration until the jetting of X drops results in a change of Δh in the height of the liquid.

Figure 7C:
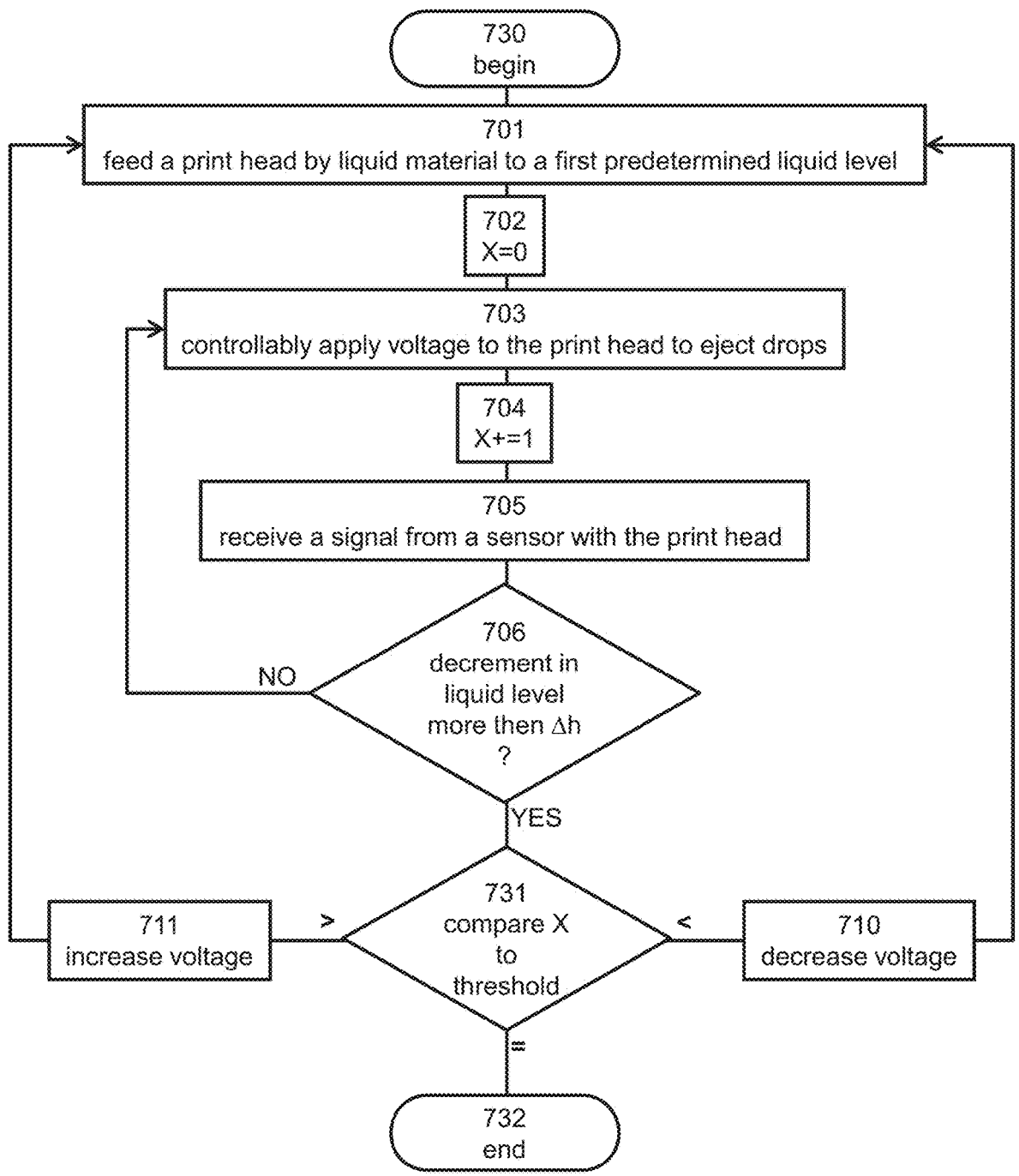

Referring to FIGS. 6A, 6B and 7C, in this representative implementation the method begins at 730, and continues to 701 at which the head is fed by liquid material to a first predetermined liquid level (see FIG. 6A), as further detailed hereinabove. The method continues to 702 at which drop counting parameter X is set to zero. At 703 voltage is controllably applied to the print head to eject drops. Preferably, the voltage is applied intermittently such as to generate drop-by-drop jetting from the nozzles of the print head. At 704 the drop counting parameter X is increased by 1. At 705, signal is received from sensor 50. The method then continues to decision 706 at which the method determines whether or not the decrement in the liquid level is more than Δh (FIG. 6B), as further detailed hereinabove. If the decrement is not more than Δh, the method loops back to 703 to eject another drop of material, increase 704 the value of X by 1, and receive 705 a signal from sensor 50. If the decrement is more than Δh, the method continues to 731 at which the method compares the number X of ejected drops to a predetermined drop number threshold. If X is less than the predetermined drop number threshold, it means that the average amount per drop is too high, and the method optionally and preferably continues to 710 at which the method decreases the voltage to be applied to the print head. If the X is less than the predetermined drop number threshold, it means that the average amount per drop is too low, and the method optionally and preferably continues to 711 at which the method increases the voltage to be applied to the print head. From 711 or 710, as the case may be, the method optionally and preferably loops back to 701. If X is the same or approximately the same as the predetermined drop number threshold, the method continues to 712 at which it ends.

Example 2

Experiments have been performed to demonstrate the ability of the present embodiments to estimate the volume and weight of a drop of liquid material based on signal from a liquid level sensor having two sensing elements at a height distance of 5 mm from each other. The density of the liquid material was 1.1 gr/ml.

Figure 8A:
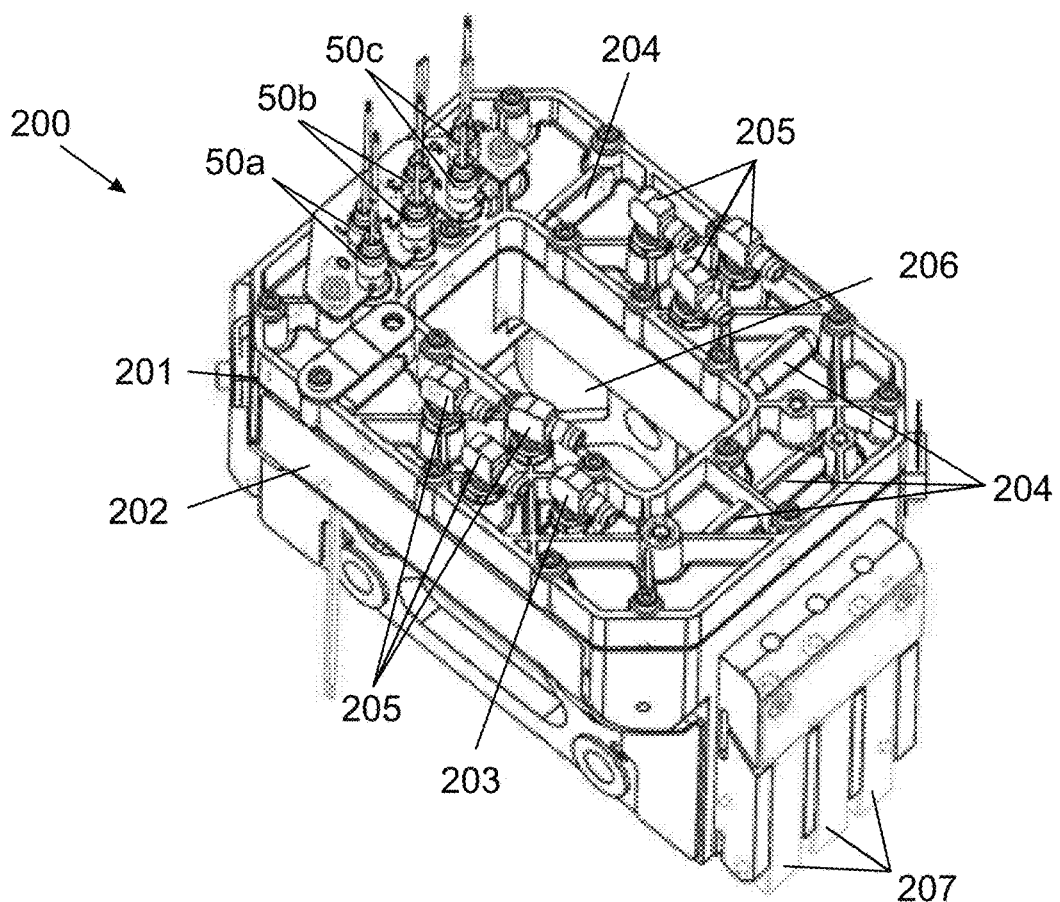
FIGS. 8A-F are schematic illustrations of a printing block used in experiments performed according to some embodiments of the present invention.
Figure 8B:
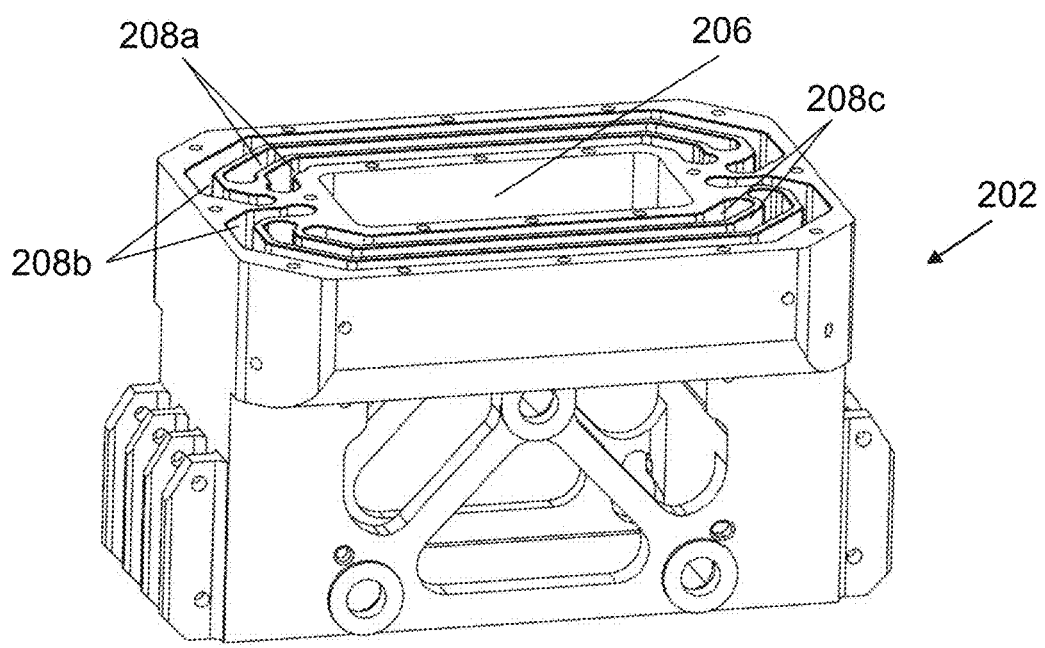
Figure 8C:
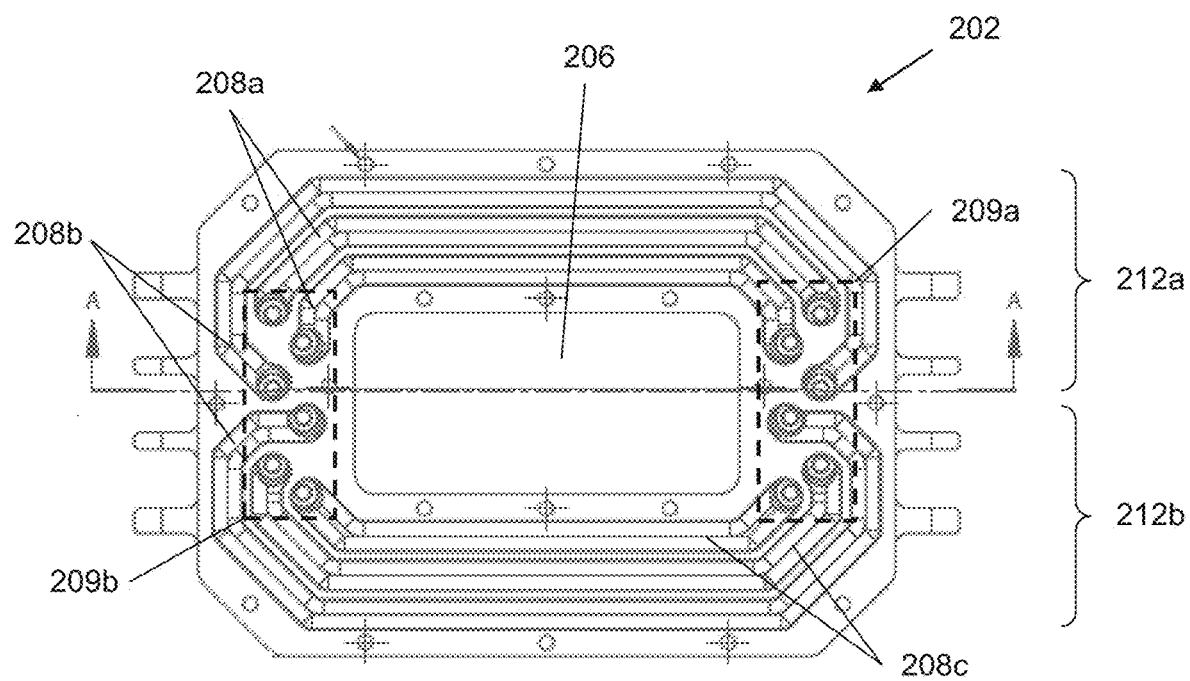
Figure 8D:
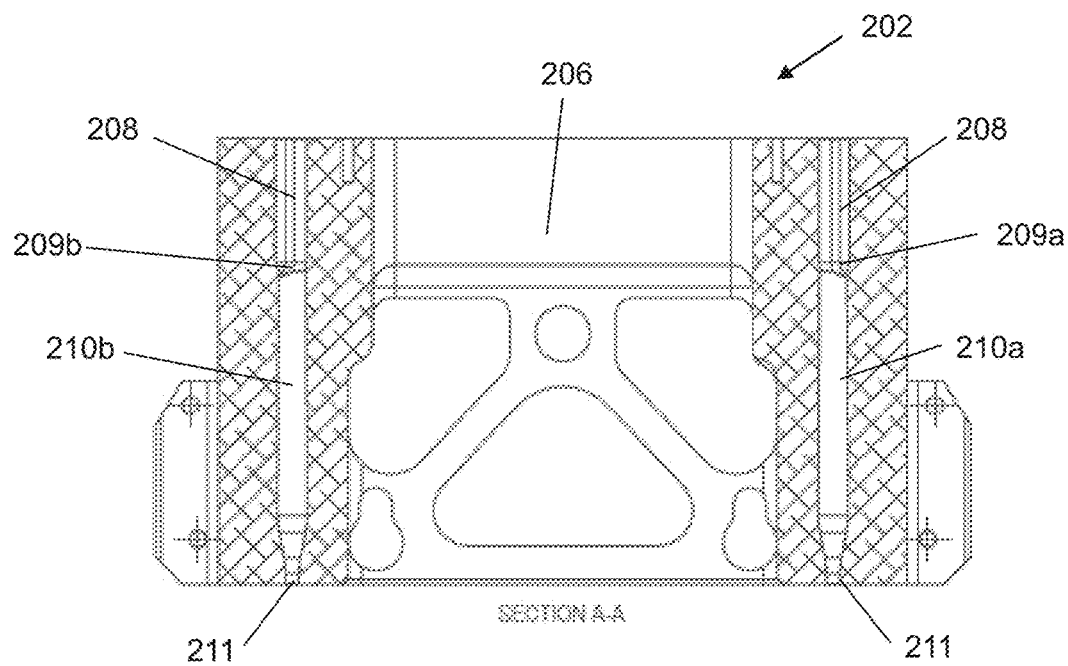
Figure 8E:
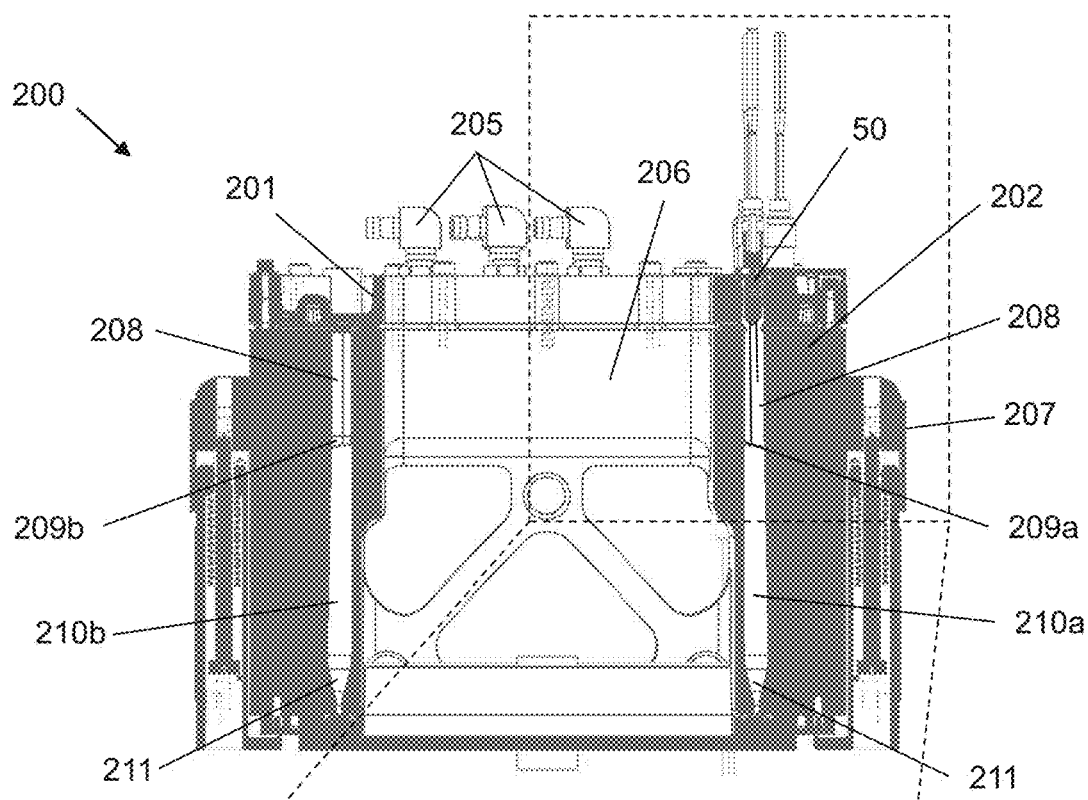
Figure 8F:
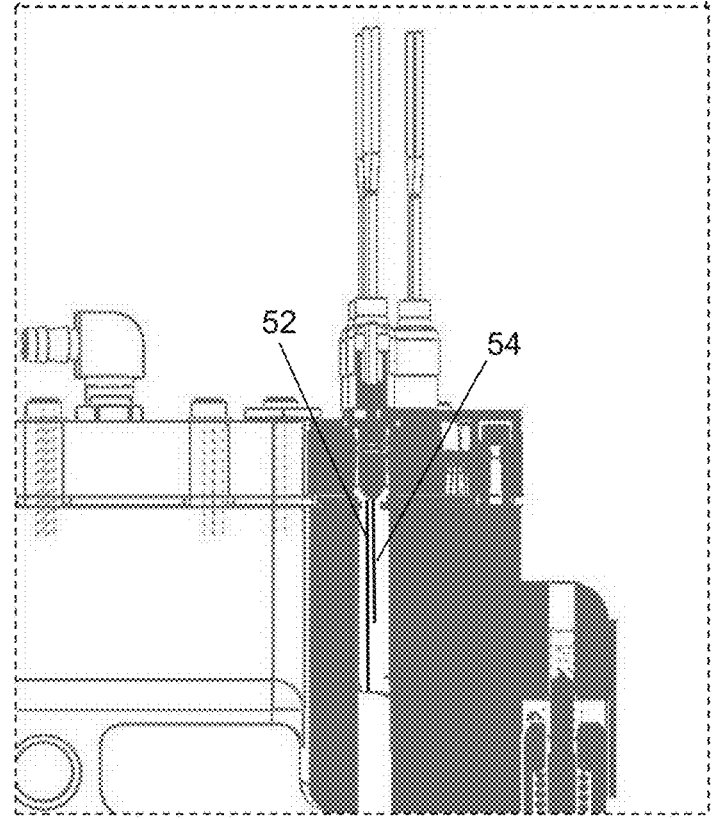

The printing block used in the experiments is illustrated in FIGS. 8A-F, where FIG. 8A illustrates a printing block assembly 200 having a printing block cover 201 and a printing block frame 202 according to some embodiments of the invention, FIG. 8B illustrates a printing block frame 202 according to some embodiments of the invention, FIG. 8C illustrates a top view of printing block frame 202 of FIG. 8B, according to some embodiments of the invention, FIG. 8D illustrates a cross-section A-A of printing block frame 202 of FIG. 8C, according to some embodiments of the invention, FIG. 8E illustrates a cross-section of printing block assembly 200 of FIG. 8A, according to some embodiments of the invention, and FIG. 8F illustrates an enlarged view of a section of printing block assembly 200 of FIG. 8E, according to some embodiments of the invention.

In FIGS. 8A-F 50a, 50b and 50c (FIG. 8A) designate level sensors for a first a second and a third dual array print head, and 208a, 208b and 208c (FIGS. 8B and 8C) designate a first, a second and a third set of horizontal material canals, wherein sensor 50a senses the liquid level in canal 208a, sensor 50b senses the liquid level in canal 208b, and sensor 50c senses the liquid level in canal 208c.

The printing block further comprises an air inlet 203; air conduits 204 for providing air communication between the material canals; building material inlet(s) 205; a central block aperture 206 for the print head cables; a spring clip housing(s) 207; a right 209a and a left 209b aperture of the material canals; a right 210a and a left 210b vertical material channels; a channel opening 211 to the print head. In FIG. 8C, 212a and 212b designate two complementary horizontal sections the printing block frame.

The determination of the liquid volume between the sensing elements of each of the liquid level sensors 50a-c, the surface area of the respective canal 208a-c was multiplied by Δh.

The results are presented in Table 1, below.

TABLE 1

|  | Canal surface area [mm$^2$] | Liquid volume [mm$^3$] | Liquid volume [ml] | Liquid weight [gr] |
| --- | --- | --- | --- | --- |
| Section 212a |  |  |  |  |
| Inner canal | 491.05 | 3020.74 | 3.02 | 3.32 |
| Middle canal | 536.45 | 3247.74 | 3.25 | 3.57 |
| Outer canal | 824.2 | 4686.49 | 4.69 | 5.16 |
| Section 212b |  |  |  |  |
| Inner canal | 448 | 2805.49 | 2.81 | 3.09 |
| Middle canal | 602.2 | 3576.49 | 3.58 | 3.93 |
| Outer canal | 907.16 | 5101.29 | 5.10 | 5.61 |

The data in Table 1 can be used for calibrating the voltage of the print head. For example, suppose that the implementation described in FIG. 7C is employed, and that it is desired to calibrate the print head such that a single drop contains about 35 ng of material. According to the data in Table 1, the drop number threshold can be set to about 94.85×10$^6$. The method in 7C is executed. If the number of drops X that are jetted to achieve a change of Δh in the liquid level within the canal is different than this threshold number, a change in the applied voltage (see 710 and 711 in FIG. 7C) is executed. As a representative example, when this implementation is applied to a print head having 192 nozzles firing at a rate of about 38 kHz, the duration of one cycle of measurement is about 13 sec.

In some embodiments of the present invention the calibration procedure is combined with a procedure for detecting defective nozzles, as known in the art (see, for example, International Publication No. WO2008/120183 the contents of which are hereby incorporated by reference), wherein the estimate of the amount of material per drop is corrected based on the number of defective nozzles.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of calibrating a print head of a printing system, comprising:
    feeding the print head with a liquid material until said liquid material contacts two sensing elements within the print head at a fixed height difference therebetween;
    closing an input port of the head to prevent entry of additional liquid material into the head;
    while said input port of the head is closed;
    repeatedly applying voltage to the print head to effect a dispensing of one or more drops of the liquid material from the print head, while receiving from said sensing elements signals indicative of contact states between said sensing elements and said liquid material; and
    varying said voltage responsively to a total number of said drops dispensed by the print head from a time at which a level of said liquid material is at a height of one of said sensing elements to a time at which said level of said liquid material is at a height of another one of said sensing elements.

2. A method of printing an object, the method comprising receiving printing data describing the object, printing of the object by a printing system based on said printing data, and executing the method according to claim 1 at least once, wherein said dispensing said liquid material is executed based on said printing data to form part of the object.

3. The method according to claim 1, wherein the print head comprises a plurality of nozzles for dispensing said liquid material, wherein said voltage is applied individually to each of said nozzles, and wherein the method comprises detecting variations in dispensing capability among said nozzles.

4. The method according to claim 3, wherein said detecting said variations in said dispensing capability is by comparing said change in said amount of liquid in the print head among individual nozzles.

5. The method according to claim 3, wherein said detecting said variations in said dispensing capability is by comparing said change in said amount of liquid in the print head among groups of nozzles.

6. The method according to claim 1, wherein said variation of said voltage is according to at least one of a calibration curve and a lookup table.

7. The method according to claim 1, wherein the printing system is a two-dimensional printing system.

8. The method according to claim 1, wherein the printing system is a three-dimensional printing system.

\* \* \* \* \*